United States Patent [19]
Yonezawa et al.

[11] Patent Number: 6,018,994
[45] Date of Patent: Feb. 1, 2000

[54] TEMPERATURE SENSITIVE FLOW SENSOR HAVING PLATE-LIKE STRAIGHTENING MEMBERS ON THE METERING PIPE

[75] Inventors: Fumiyoshi Yonezawa; Tomoya Yamakawa; Hiroyuki Uramachi, all of Tokyo, Japan

[73] Assignee: Mitsubishi Denki Kabushiki Kaisha, Tokyo, Japan

[21] Appl. No.: 08/998,035

[22] Filed: Dec. 23, 1997

[30] Foreign Application Priority Data

Apr. 24, 1997 [JP] Japan ................................ 9-107675

[51] Int. Cl.⁷ ...................................... G01F 1/68
[52] U.S. Cl. ................... 73/202.5; 73/204.21; 73/118.2; 73/202
[58] Field of Search ................... 73/202, 232.5, 73/204.21, 204.22, 118.2

[56] References Cited

U.S. PATENT DOCUMENTS

| | | | |
|---|---|---|---|
| 4,403,506 | 9/1983 | Lauterbach | 73/202.5 |
| 4,418,568 | 12/1983 | Surman | 73/202.5 |
| 4,942,763 | 7/1990 | Harpster | 73/202.5 |
| 4,991,560 | 2/1991 | Arai et al. | 73/204.22 |
| 5,467,648 | 11/1995 | Igarashi et al. | 73/202.5 |
| 5,544,527 | 8/1996 | Kitahara et al. | 73/204.21 |
| 5,654,506 | 8/1997 | Yoneda et al. | 73/202.5 |

FOREIGN PATENT DOCUMENTS

| | | |
|---|---|---|
| 5-1930 | 1/1983 | Japan . |
| 4-318425 | 11/1992 | Japan . |

*Primary Examiner*—Harshad Patel
*Attorney, Agent, or Firm*—Sughrue, Mion, Zinn, Macpeak & Seas, PLLC

[57] ABSTRACT

Plate-like straightening members are provided between a main conduit and a metering pipe stored in the main conduit to suppress the deviation of a flow of a fluid in the main conduit and stabilize a flow in the metering pipe.

7 Claims, 13 Drawing Sheets

VIEW FROM A

VIEW FROM B

PRIOR ART 6,018,994

TEMPERATURE SENSITIVE FLOW SENSOR HAVING PLATE-LIKE STRAIGHTENING MEMBERS ON THE METERING PIPE

BACKGROUND OF THE INVENTION

1. Field of the Invention

This invention relates to a heat sensitive flow sensor for detecting the flow rate of a fluid such as a gas or liquid and, more specifically, to a heat sensitive flow sensor suitable for detecting the amount of air flowing into an internal combustion engine of an automobile, for example.

2. Description of the Prior Art

FIG. 24 is a partial sectional view of a conventional heat sensitive flow sensor as shown in Laid-open Japanese Patent Application No. Hei 5-1930, for example. In the figure, reference numeral 1 denotes a main conduit in which air passing through an air cleaner and circulates, and 2 a flow straightener, composed of a honeycomb face plate, for straightening an intake air flow and correcting a flow velocity distribution or the like. Reference numeral 3 represents a metering pipe whose air inflow side is shaped like a reversed cone and which is fitted with a heat resistor 4 for metering the volume of intake air, 5 a strut for supporting the metering pipe, 6 a control circuit portion, and 7 a temperature compensation resistor for metering the temperature of intake air.

This heat sensitive flow sensor is installed in an air introduction passage of an internal combustion engine to output a signal corresponding to the flow rate of intake air. The output of the flow rate of intake air is sent to an unshown engine control circuit as a factor of controlling an engine.

That is, air passing through the air cleaner of the internal combustion engine flows through the flow straightener 2 and part of the air flows into the metering pipe 3. At this point, the quantity of heat corresponding to the volume of intake air is absorbed from the heat resistor 4. However, since the circuit portion 6 controls such that the difference between the temperature of the part of air flowing into the metering pipe 3 and the temperature of intake air measured by the temperature compensation resistor 7 should be kept almost constant regardless of the volume of intake air, the volume of intake air can be measured from the value of a current running through the heat resistor 4.

Efforts are being made to reduce the sizes of and integrate devices and parts installed in an engine room. For instance, in an air intake system for a fuel injection system, a heat sensitive flow sensor is arranged in the vicinity of a throttle valve or an air intake duct to be installed at an upstream or downstream of the sensor is curved to reduce the length of an air intake passage in some cases.

When the throttle valve is installed in the vicinity of a downstream side of the heat sensitive flow sensor as described above and the opening of the throttle valve is small, a drift in the main conduit, that is, an air flow leaning to an upper, lower, right or left portion of the metering pipe 3 becomes large, and a flow in the metering pipe is affected by that flow. Therefore, when the opening of the throttle valve is small, there is such a problem that the metering accuracy of the volume of intake air lowers. When a curved air intake duct is arranged on an upstream side of the heat sensitive flow sensor, the above drift is also produced in the air intake passage. This drift is greatly affected by a stain on an air cleaner element installed at a further upstream of the heat sensitive flow sensor, whereby a flow in the metering pipe is changed with the result that the metering accuracy of the volume of intake air lowers along with the passage of time. The degree of a reduction in the metering accuracy is relatively larger than when the air intake duct arranged at an upstream of the heat sensitive flow sensor is not curved.

The present invention has been made to solve the above problems and it is therefore an object of the present invention to provide a heat sensitive flow sensor which is capable of stabilizing an inflow and outflow in a metering pipe by suppressing a drift in a main conduit and reducing a metering error of the volume of intake air even when a drift source such as a throttle valve is present in the vicinity of a downstream side of the heat sensitive flow sensor or when an air intake duct to be installed at an upstream and downstream of the sensor is curved.

It is another object of the present invention to reduce a pressure loss which is generated at an upstream and downstream of the heat sensitive flow sensor.

SUMMARY OF THE INVENTION

According to a first aspect of the present invention, there is provided a heat sensitive flow sensor wherein plate-like straightening members extending in a direction parallel to the central axis of a metering pipe are provided between a main conduit and the metering pipe.

According to a second aspect of the present invention, there is provided a heat sensitive flow sensor wherein straightening members are projected in an upstream direction from an inflow port or a downstream direction from an outflow port of a metering pipe, or both directions.

According to a third aspect of the present invention, there is provided a heat sensitive flow sensor wherein E straightening members are projected in an upstream direction from an inflow port of a metering pipe and a cutaway portion is provided on a downstream side of a lower straightening member.

According to a fourth aspect of the present invention, there is provided a heat sensitive flow sensor wherein straightening members are projected in a downstream direction from an outflow port of a metering pipe and a cutaway portion is provided on an upstream side of a lower straightening member.

According to a fifth aspect of the present invention, there is provided a heat sensitive flow sensor wherein a plurality of straightening members are provided at positions for dividing the peripheral direction of a metering pipe.

According to a sixth aspect of the present invention, there is provided a heat sensitive flow sensor wherein end portions of straightening members are tapered off in an upstream direction.

According to a seventh aspect of the present invention, there is provided a heat sensitive flow sensor wherein straightening members are made thinner in a downstream direction.

The above and other objectives, features and advantages of the invention will become more apparent from the following description when taken in conjunction with the accompanying drawings.

BRIEF DESCRIPTION OF THE ACCOMPANYING DRAWINGS

Figure 16:
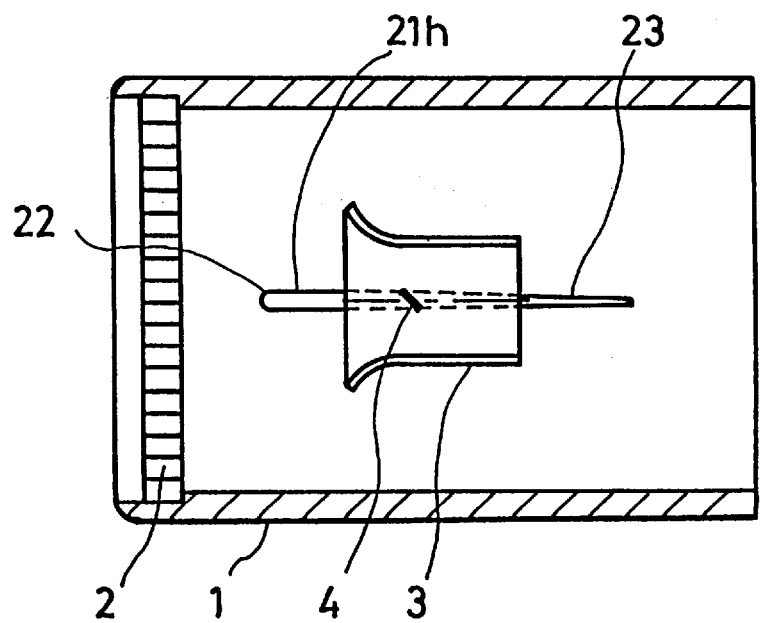
Figure 17:
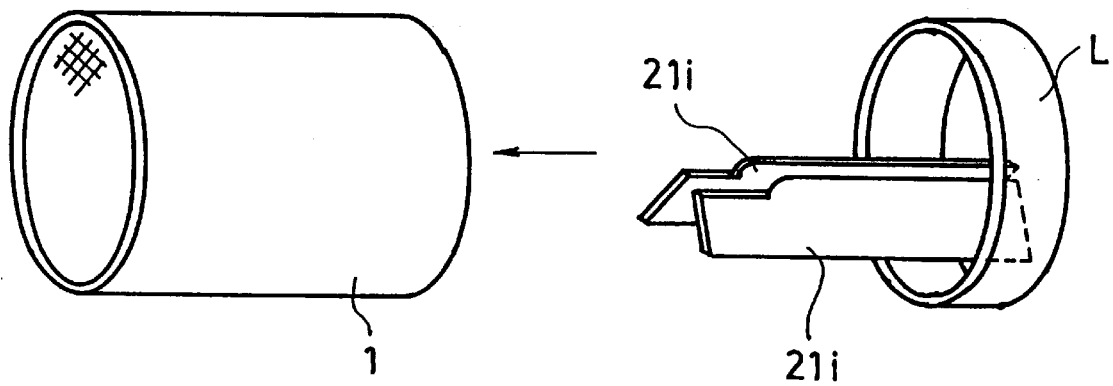
Figure 18:
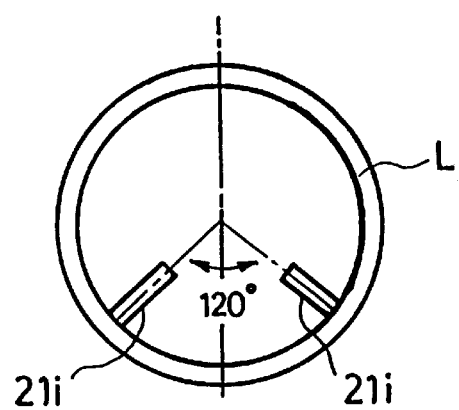
Figure 19:
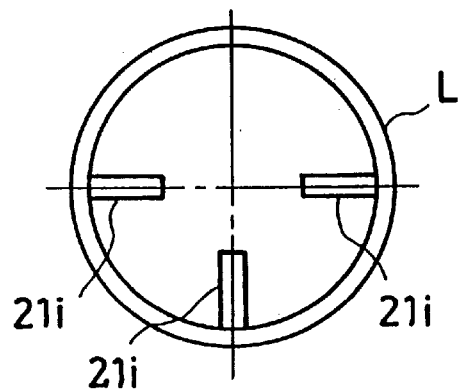
Figure 20:
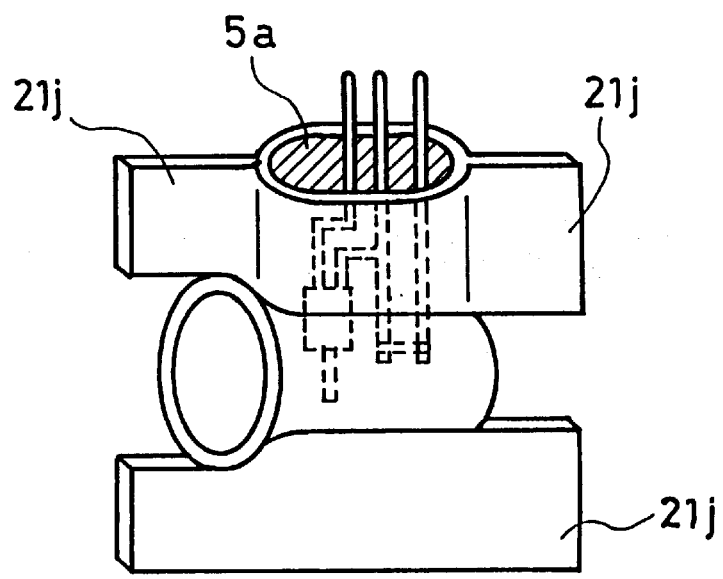
Figure 22:
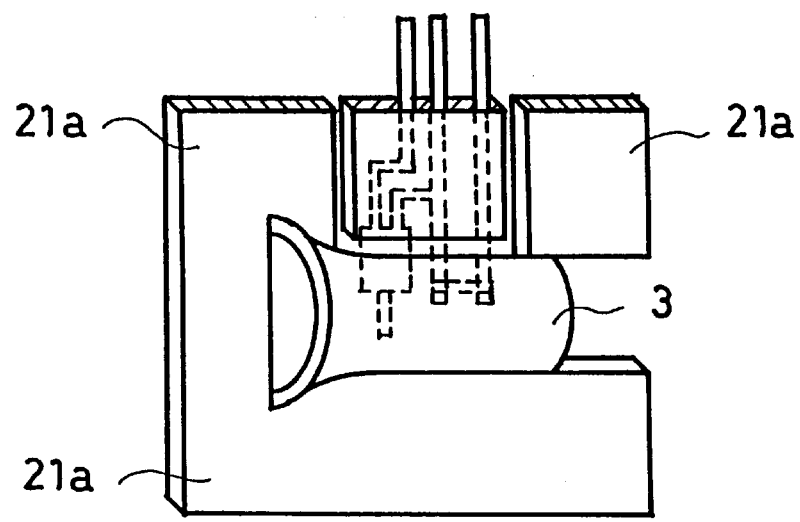
Figure 23:
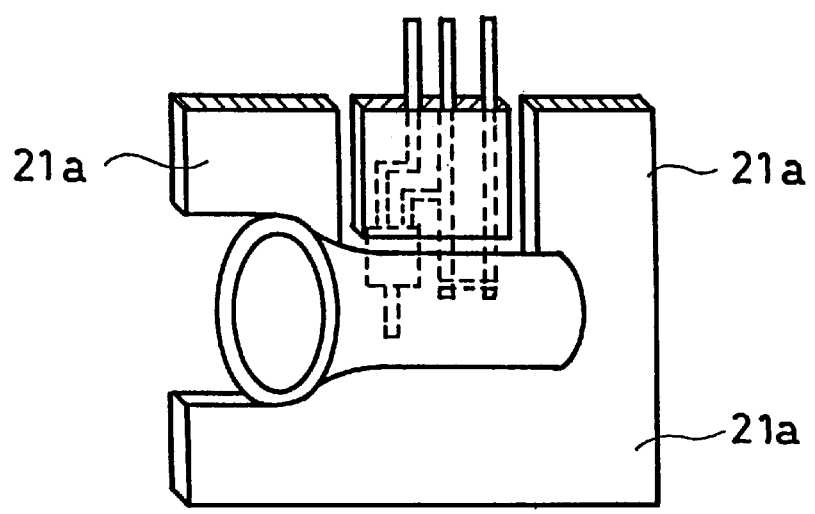
Figure 24:
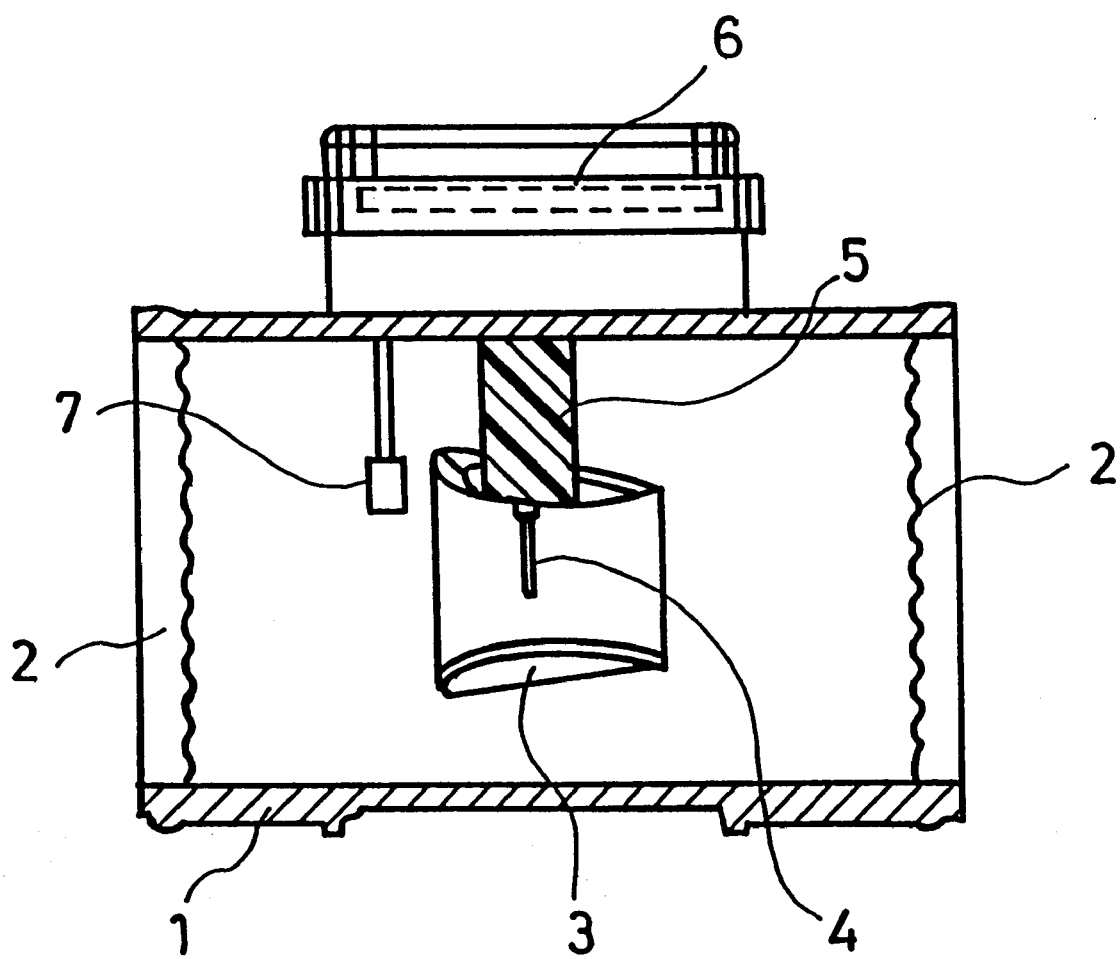

FIG. 16 a sectional view of a heat sensitive flow sensor according to Embodiment 8 of the present invention;

FIG. 17 is a perspective view of a heat sensitive flow sensor according to another embodiment of the present invention;

FIG. 18 is a front view of the heat sensitive flow sensor shown in FIG. 17;

FIG. 19 is a diagram of a heat sensitive flow sensor according to still another embodiment of the present invention;

FIG. 20 is a diagram of a heat sensitive flow sensor according to a further embodiment of the present invention;

FIG. 21 is a diagram of a heat sensitive flow sensor according to a still further embodiment of the present invention;

FIG. 22 is a diagram of a heat sensitive flow sensor according to a still further embodiment of the present invention;

FIG. 23 is a diagram of a heat sensitive flow sensor according to a still further embodiment of the present invention; and FIG. 24 is a partial sectional view of a heat sensitive flow sensor of the prior art.

DETAILED DESCRIPTION OF THE PREFERRED EMBODIMENTS

Embodiment 1

Figure 1:
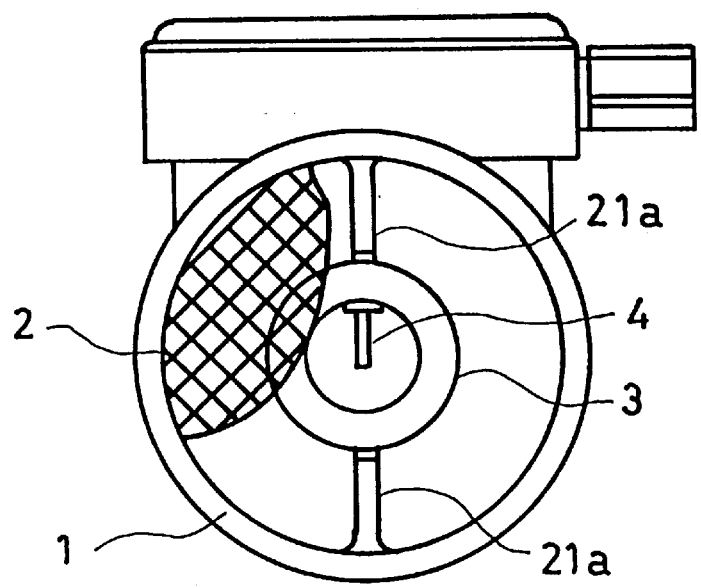
FIG. 1 is a diagram of a heat sensitive flow sensor according to Embodiment 1 of the present invention when seen from an upstream side.
Figure 2:
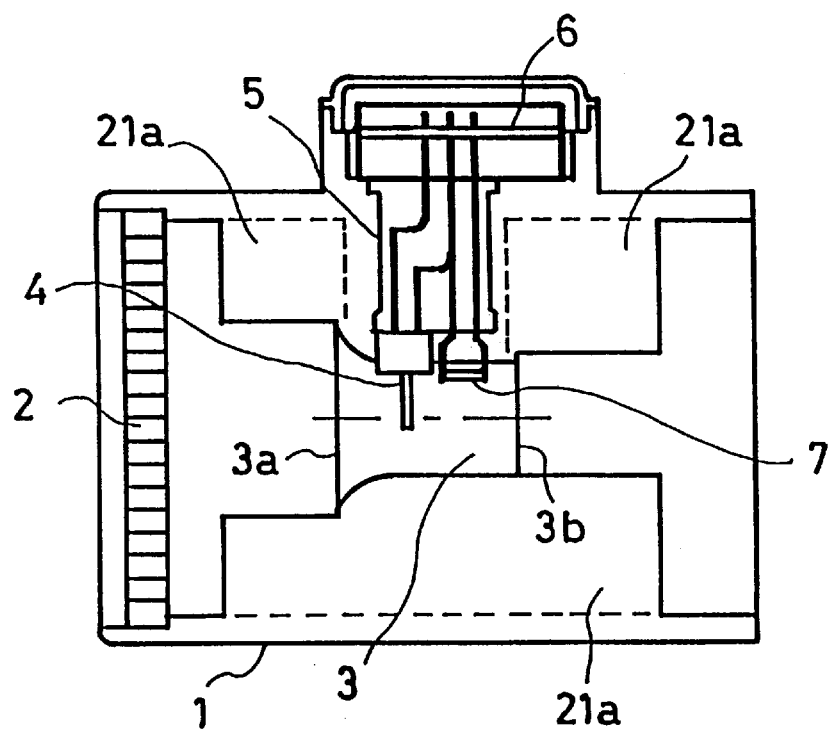
FIG. 2 is a sectional view of the heat sensitive flow sensor of FIG. 1.
Figure 3:
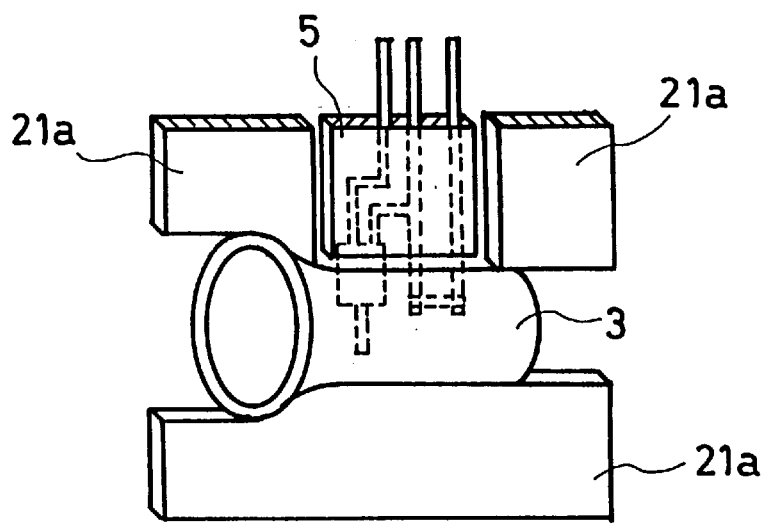
FIG. 3 is a perspective view of key parts of the heat sensitive flow sensor of FIG. 1.

FIG. 1 is a schematic diagram of a heat sensitive flow sensor according to Embodiment 1 of the present invention when seen from an upstream side thereof. The same or corresponding elements as those of FIG. 24 are given the same reference symbols. FIG. 2 is a sectional view of FIG. 1 and FIG. 3 is a perspective view of the key parts of the heat sensitive flow sensor. In these figures, a flow passage is formed by the main conduit 1 which is an air intake passage and the metering pipe 3 containing the heat resistor 4 for metering the flow rate. Denoted by 21a are plate-like straightening members which are provided between the main conduit 1 and the metering pipe 3 substantially in parallel to the central axis of the metering pipe 3. The upper and lower plate-like straightening members 21a and 21a project from upper and lower opposite positions on the inner surface of the main conduit 1 toward a central axis direction of the metering pipe 3. Also, they project in an upstream direction from an inflow port 3a side of the metering pipe 3 and further in a downstream direction from an outflow port 3b side of the metering pipe 3. The upper straightening member 21a is divided into right and left portions and serves as a strut for supporting the metering pipe 3. Between the right and left portions of the straightening member 21a, attachment members for a detection element 4 and a resistor 7 are interposed. Reference numeral 5 denotes a strut.

Figure 4:
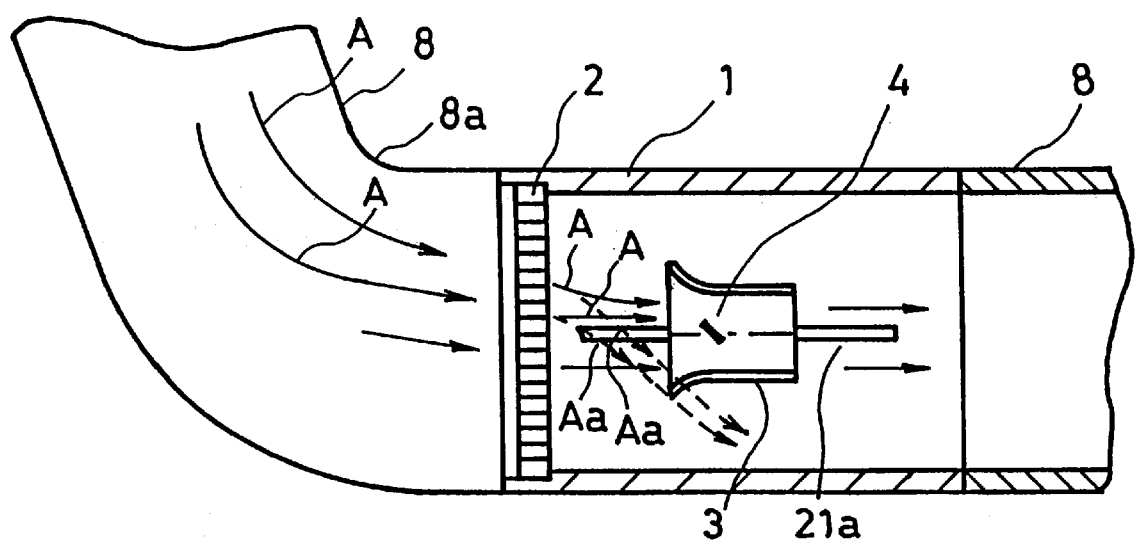
FIG. 4 is a schematic diagram showing the straightening function of the present invention.

When this heat sensitive flow sensor is connected to an air intake duct 8 part 8a of a rear portion of which is curved as shown in FIG. 4, it is arranged in such a manner that air A curved by the air intake duct 8 is directed to such a direction that it contacts the straightening member 21a.

In the heat sensitive flow sensor constituted above, as shown in FIG. 4, when the air intake duct 8 is arranged on an upstream side of the heat sensitive flow sensor in such a manner that the part 8a of the rear portion thereof is curved, a drift is produced in the main conduit 1 from the air intake duct 8 and changed by a stain on an air cleaner element provided at a further upstream. The deviation of the flow in the main conduit is suppressed by correcting the vector of the flow which is substantially unparallel to the central axis of the metering pipe 3 to be substantially parallel from a portion close to the drift source, thereby stabilizing an inflow into the metering pipe 3. In other words, without the straightening members 21a, air A flows in while being curved and drifts down as shown by air Aa. However, this embodiment of the present invention can prevent this.

Figure 5:
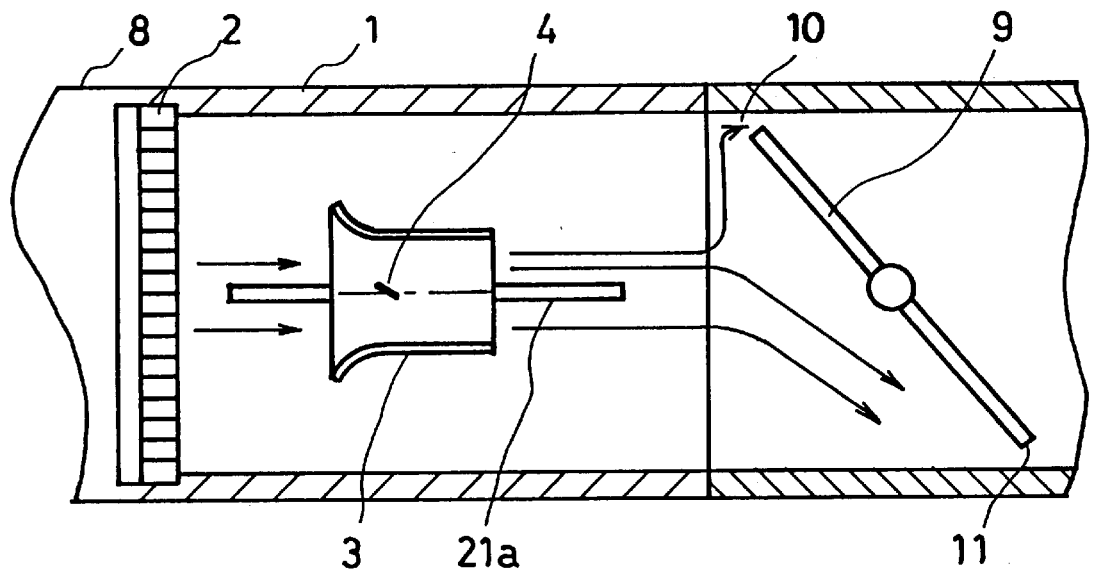
FIG. 5 is a schematic diagram showing the straightening function of the present invention.

When a throttle valve 9 is provided in the vicinity of a downstream side of the heat sensitive flow sensor as shown in FIG. 5 and the opening of the throttle valve 9 is small, as the difference of ventilation resistance between a flow passage 10 on a side where the throttle valve 9 opens in an upstream direction and a flow passage 11 on the opposite side is large, a drift in the main conduit becomes large. However, when the opening of the throttle valve 9 is small and the difference of ventilation resistance between the above passages 10 and 11 is large, a flow in the main conduit 1 is straightened by the straightening member 21a of the present invention to become substantially parallel to the central axis of the metering pipe 3 up to a portion close to the throttle valve 9, thereby reducing the deviation of the flow in the main conduit 1 and stabilizing a flow in the metering pipe 3.

In the above figures, a honeycomb face plate 2 which has been used conventionally is shown only on an inlet side of the main conduit 1. However, this doesn't means that it is required on an upstream side and it is needless to say that it may be arranged on a downstream side.

Embodiment 2

Figure 6:
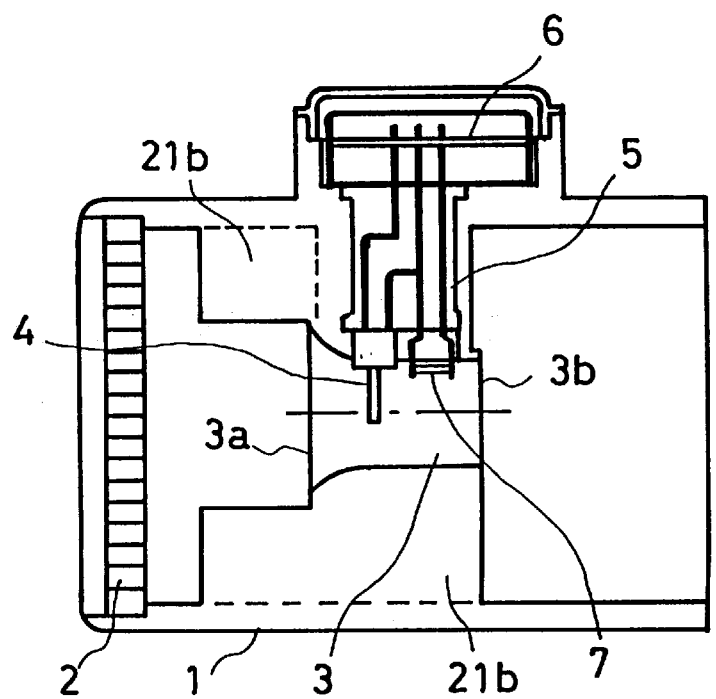
FIG. 6 is a sectional view of a heat sensitive flow sensor according to Embodiment 2 of the present invention.
Figure 7:
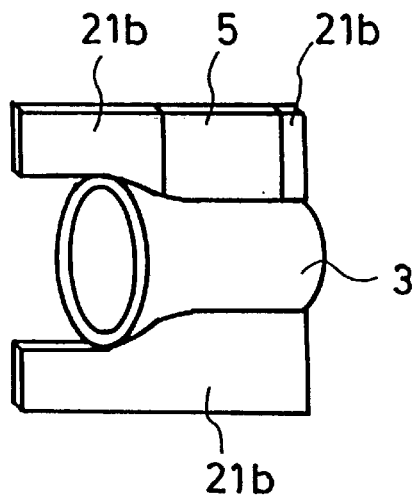
FIG. 7 is a perspective view of key parts of the heat sensitive flow senors of FIG. 6.

FIGS. 6 and 7 are sectional and perspective views of a heat sensitive flow sensor according to Embodiment 2 of the present invention, respectively. Plate-like straightening members 21b provided between the main conduit 1 and the metering pipe 3 are arranged such that they project in an upstream direction from the inflow port 3a of the metering pipe 3. As shown in FIG. 4, in the case of an air intake system where there is produced a large drift on an upstream side and a drift on a downstream side can be ignored, the plate-like straightening members 21a are projected in an upstream direction from the inflow port 3a of the metering pipe 3, whereby the same straightening function as that of Embodiment 1 is obtained and a flow in the metering pipe is stabilized. In addition, since the straightening members do not project on the outflow port 3b side, friction resistance a produced on the surfaces of the straightening members can be reduced and there is no possibility of providing excessive resistance to an air flow directed to a downstream direction.

Embodiment 3

Figure 8:
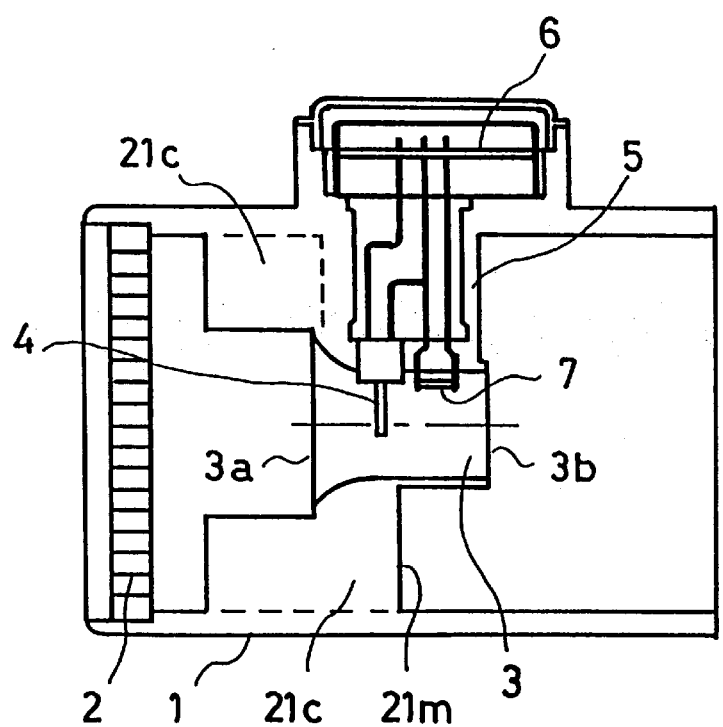
FIG. 8 is a sectional view of a heat sensitive flow sensor according to Embodiment 3 of the present invention.
Figure 9:
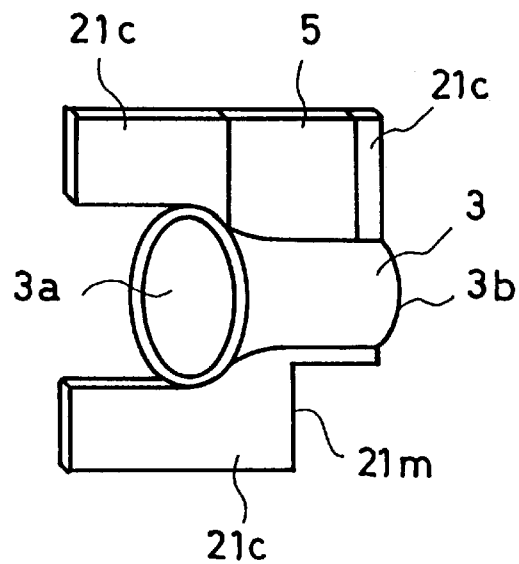
FIG. 9 is a perspective view of key parts of the heat sensitive flow sensor according to Embodiment 3 of the present invention.

FIGS. 8 and 9 are sectional and perspective views of a heat sensitive flow sensor according to Embodiment 3 of the present invention, respectively. Plate-like straightening member 21c provided between the main conduit 1 and the metering pipe 3 project in an upstream direction from the inflow port 3a of the metering pipe 3 and a cutaway portion 21m is formed by cutting away a portion corresponding to the outflow port 3b from the lower straightening member 21c with the result that the lower straightening member 21c becomes shorter than the metering pipe 3. Thus, the straightening member 21c is arranged on an upstream side of the metering pipe 3.

In the case of an air intake system as shown in FIG. 4, the plate-like straightening members 21 are projected from the inflow port 3a of the metering pipe 3 and arranged in an upstream direction close to the draft source, whereby the same straightening function as that of Embodiment 1 can be obtained for a drift on an upstream side. In addition, since the cutaway portion 21m is formed by cutting away a portion of the straightening member corresponding to the outflow port 3b, friction resistance produced on the surfaces of the straightening members can be further reduced and the pressure loss of the heat sensitive flow sensor can be minimized.

Embodiment 4

Figure 10:
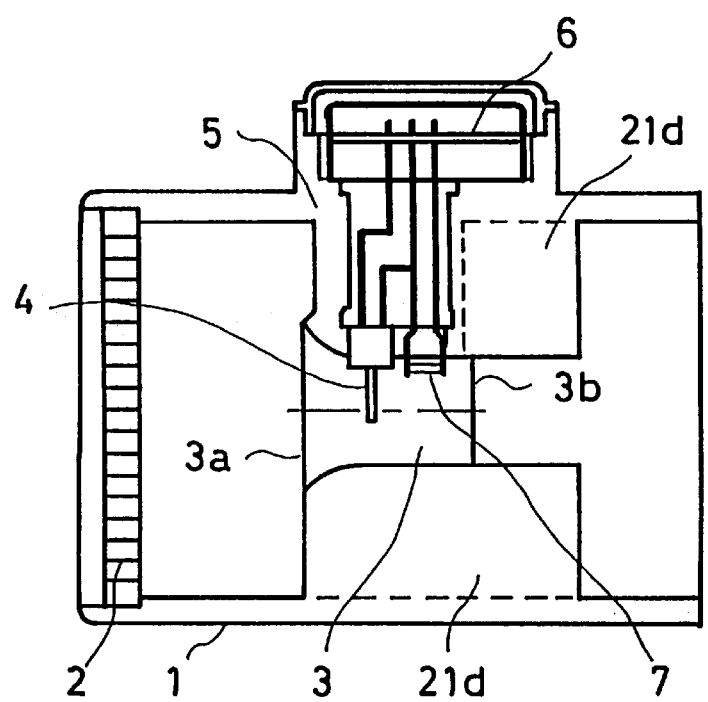
FIG. 10 is a sectional view of a heat sensitive flow sensor according to Embodiment 4 of the present invention.

FIG. 10 is a sectional view of a heat sensitive flow sensor according to Embodiment 4 of the present invention. In this case, plate-like straightening members 21d provided between the main conduit 1 and the metering pipe 3 are arranged such that they project in a downstream direction from the outflow port 3b side of the metering pipe 3. In the case of an air intake system where a drift on an upstream side can be ignored and a large drift source is present in the vicinity of a downstream side as shown in FIG. 5, the plate-like straightening members 21d are projected in a downstream direction from the outflow port 3b of the metering pipe 3, whereby the same straightening function as that of Embodiment 1 can be obtained for a drift on a downstream side and a flow in the metering pipe is stabilized. Particularly, since the straightening members 21d do not project in an upstream direction from the inflow port 3a in this embodiment, friction resistance produced on the surfaces of the straightening members on an upstream side can be reduced.

Embodiment 5

Figure 11:
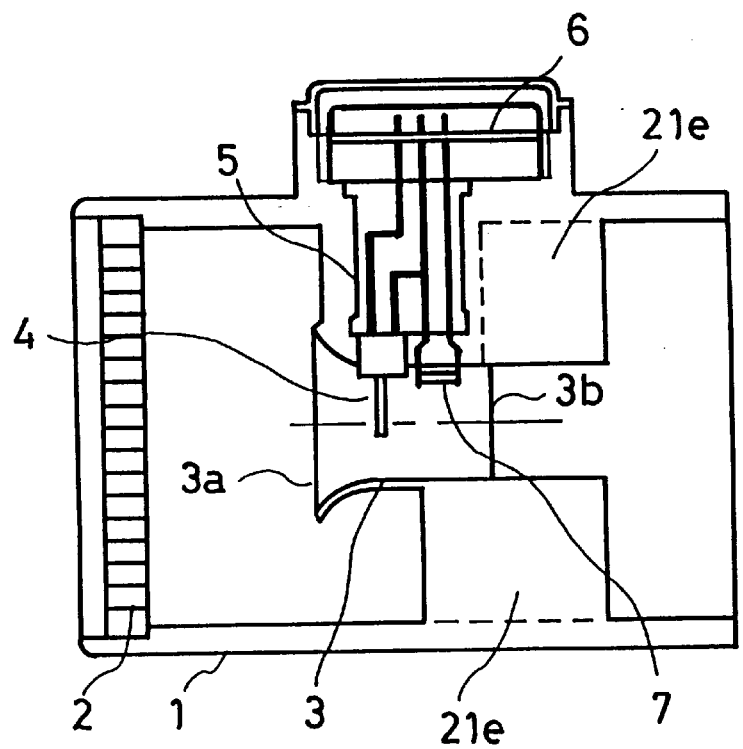
FIG. 11 is a sectional view of a heat sensitive flow sensor according to Embodiment 5 of the present invention.
Figure 12:
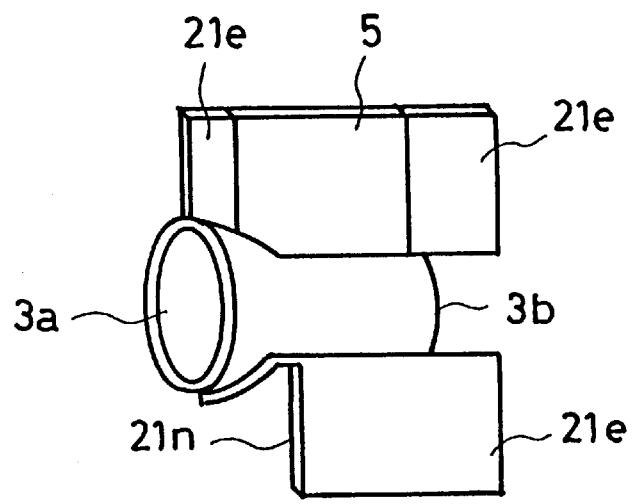
FIG. 12 is a perspective view of key parts of the heat sensitive flow sensor according to Embodiment 5 of the present invention.

FIGS. 11 and 12 are sectional views of a heat sensitive flow sensor according to Embodiment 5 of the present invention. Plate-like straightening members 21e provided between the main conduit 1 and the metering pipe 3 project in a downstream direction from the outflow port 3b side of the metering pipe 3 and a cutaway portion 21n is formed by cutting away a portion on the inflow port 3a side of the lower straightening member 21 with the result that the lower straightening member 21 becomes shorter than the metering pipe 3. Thus, the straightening member 21e is arranged on a downstream side of the pipe 3.

In the case of an air intake system as shown in FIG. 5, the plate-like straightening members 21 are projected from the outflow port 3b of the metering pipe 3 and arranged in a downstream direction close to the drift source, whereby the same straightening function as that of Embodiment 1 can be obtained for a drift on a downstream side and friction resistance produced on the surfaces of the straightening members can be further reduced by the presence of the cutaway portion 21n. As a result, the pressure loss of the heat sensitive flow sensor can be reduced.

Embodiment 6

Figure 13:
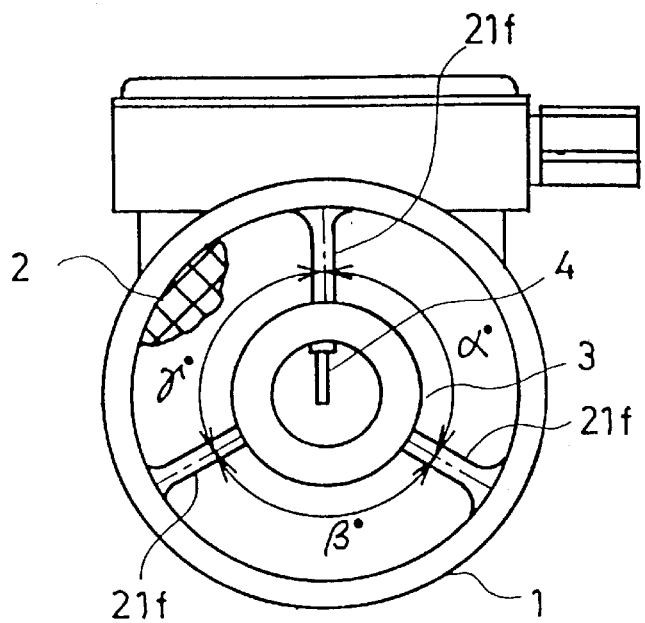
FIG. 13 is a diagram of a heat sensitive flow sensor according to Embodiment 6 of the present invention when seen form an upstream side.

FIG. 13 is a schematic diagram of a heat sensitive flow sensor according to Embodiment 6 of the present invention when seen from an upstream side. In this figure, three plate-like straightening members 21f provided between the main conduit 1 and the metering pipe 3 are arranged in a peripheral direction at equal intervals in such a manner that their attachment angles $\alpha$, $\beta$ and $\gamma$ are almost the same and they divide an air intake passage in the main conduit 1 equally. Thereby, a high straightening function can be obtained even for a rotation flow on an upstream side. When the number of plate-like straightening members 21 is increased to four, five or more, the straightening function is improved more.

Embodiment 7

Figure 14:
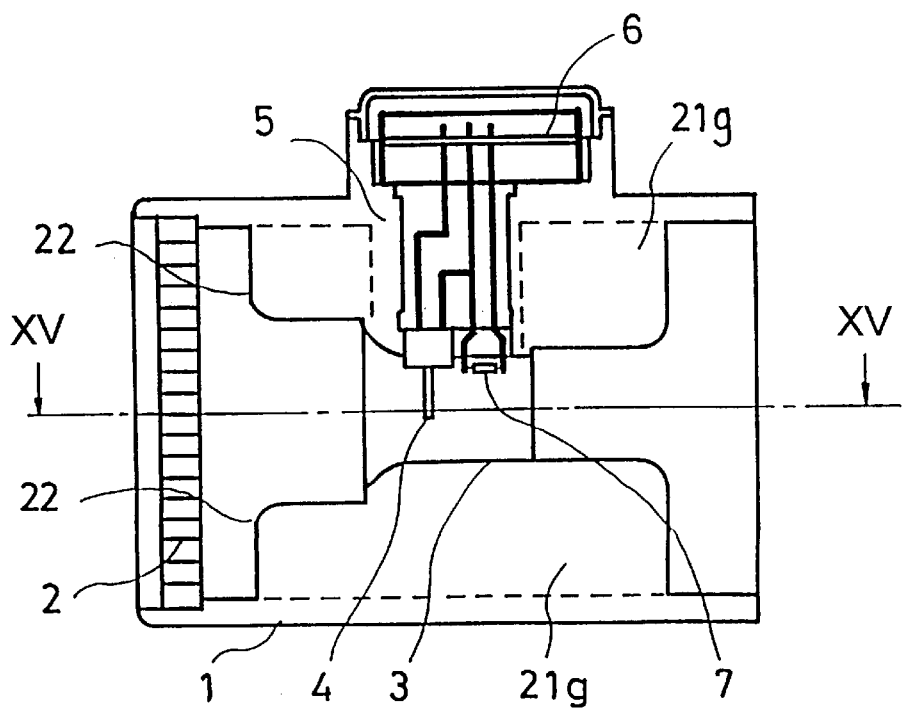
FIG. 14 is a sectional view of a heat sensitive flow sensor according to Embodiment 7 of the present invention.
Figure 15:
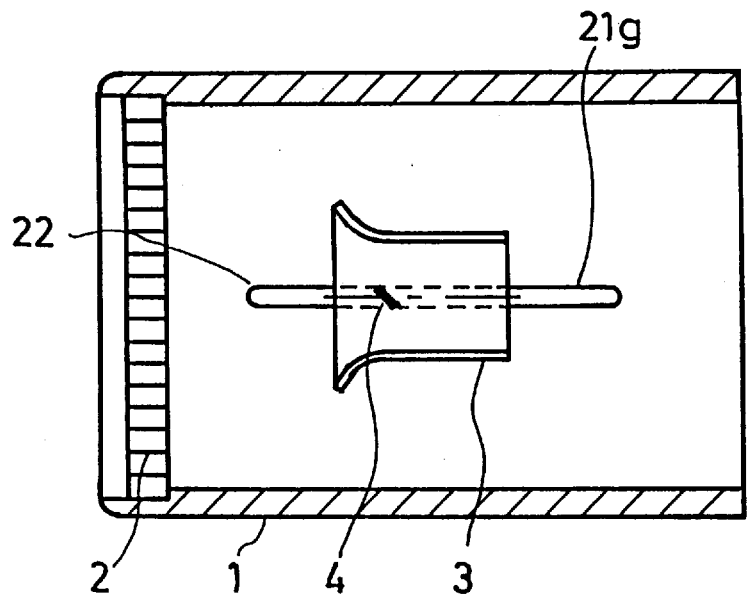
FIG. 15 is a sectional view taken on line XV—XV of the heat sensitive flow sensor shown in FIG. 14.

FIGS. 14 and 15 are sectional views of a heat sensitive flow sensor according to Embodiment 7 of the present invention. FIG. 15 is a sectional view taken on line XV—XV of FIG. 14. Edge portions on an upstream side of plate-like straightening members 21g provided between the main conduit and the metering pipe 3 are rounded as indicated by 22. The same straightening function as that of Embodiment 1 can be obtained and shape resistance can be reduced by the rounded edges 22, thereby alleviating the stagnation of a fluid and suppressing peeling.

Embodiment 8

FIG. 16 is a sectional view of a heat sensitive flow sensor according to Embodiment 8 of the present invention. End portions on an upstream side of plate-like straightening members 21h provided between the main conduit 1 and the metering pipe 3 are rounded as indicated by 22 and the straightening members 21h are tapered off as indicated by 23 such that the widths of their cross sections (thicknesses) become small gradually from an upstream side to a downstream side, whereby the suppression of peeling by an intake fluid as described in Embodiment 7 can further be improved.

While the plate-like straightening member are integrated with the main conduit 1 or the metering pipe 3 in the present invention, the present invention is not limited to this and the plate-like straightening members may be a separate unit. As shown in FIGS. 17 and 18, straightening members 21i may be integrated with a ring L to be fitted into a rear portion of the main conduit 1 so that the straightening members 21 are inserted into the main conduit 1 from the rear portion. In this case, two straightening members 21i may be arranged in a lower portion of the ring L apart from each other at an angle of 120° as shown in FIG. 18, or three straightening members 21i may be arranged in a lower portion of the ring L like letter T as shown in FIG. 19.

Figure 21A:
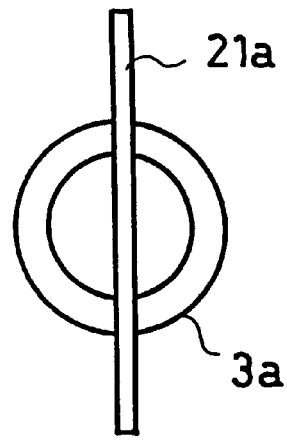
Figure 21B:
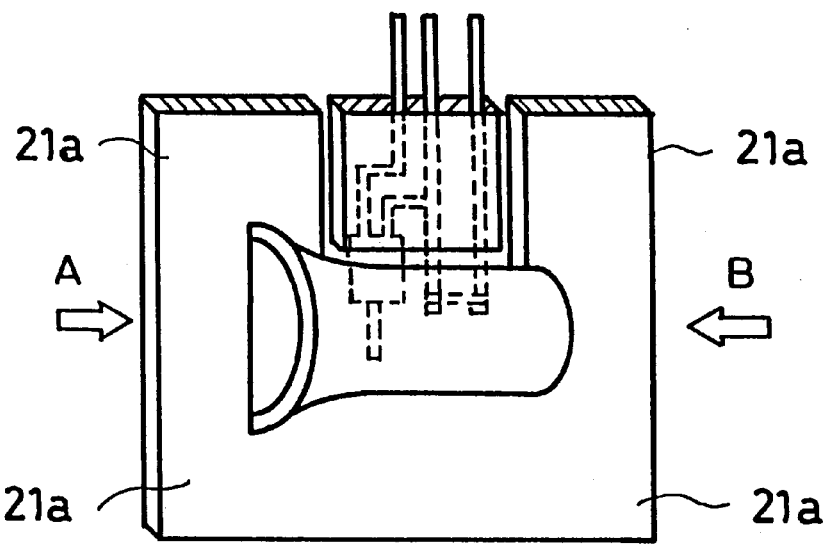
Figure 21C:
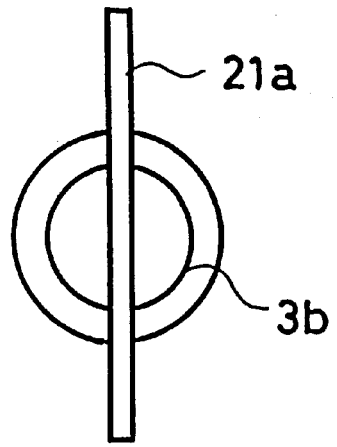

In the present invention, as shown in FIG. 20, an upper straightening member 21j may be formed as a single unit and a hole may be formed in the center of the straightening member 21j as a portion for accepting the detection element 4 and the resistor 7. While air to be introduced into the internal combustion engine has been described as the fluid in the present invention, the present invention can be applied to other fluid such as a liquid. In the present invention, as shown in FIGS. 21A, 21B and 21C, the upper and lower straightening members 21a are connected to each other as a single plate on both the inflow port 3a and the outflow port 3b sides of the metering pipe 3 in the heat sensitive flow sensor shown in FIG. 3 so that the plate extends vertically on the inflow port 3a and the outflow port 3b sides.

Alternatively, the upper and lower straightening members 21a are connected to each other only on the inflow port 3a side as shown in FIG. 22 or only on the outflow port 3b side as shown in FIG. 23.

According to the first aspect of the present invention, since plate-like straightening members which extend in a direction parallel to the central axis of a metering pipe are provided between a main conduit and the metering pipe, it is possible to prevent a fluid from being deviated. Therefore, regardless of a stain on an air cleaner element when a greatly curved air intake duct is provided at an upstream of a heat sensitive flow sensor, a flow in the metering pipe can be stabilized and the measurement error of the volume of intake air can be reduced. Or when a throttle valve is provided in the vicinity of a downstream side of the heat sensitive flow sensor, the opening of the throttle valve is small, and the difference of ventilation resistance between flow passages formed between the interior wall of the main conduit and the throttle valve is large, a flow in the main conduit can be straightened up to the vicinity of the drift source to become substantially parallel to the central axis of the metering pipe, thereby stabilizing a flow in the metering pipe.

According to the second aspect of the present invention, since straightening members are arranged in an upstream direction from an inflow port or a downstream direction from an outflow port of the metering pipe or both directions, either one of flows on the inflow port side and the outflow port side or both flows are stabilized, thereby making it possible to reduce the measurement error of the volume of intake air.

According to the third aspect of the present invention, since straightening members are provided in such a manner that they project in an upstream direction from the inflow port side of the metering pipe, a flow of a fluid on a further upstream side of the inflow port of the metering pipe can be straightened. In addition, since an end portion on a downstream side of a lower straightening member is cut away, resistance to the flow of the fluid is reduced, thereby making it possible to guide the fluid to a downstream side stably.

According to the fourth aspect of the present invention, since straightening members are provided in such a manner that they project in a downstream direction from the outflow port side of the metering pipe, a flow of a fluid on a further downstream side of the outflow port of the metering pipe can be straightened. In addition, since an end portion on a upstream side of a lower straightening member is cut away, resistance to the flow of the fluid is reduced, thereby making it possible to guide the fluid to the downstream side stably.

According to the fifth aspect of the present invention, since a plurality of straightening members are provided at positions for dividing the peripheral direction of the metering member, a flow can be straightened over the entire periphery of the metering pipe.

According to the sixth aspect of the present invention, since end portions of straightening members are tapered off in an upstream direction, a flow can be straightened without giving a wasteful pressure loss to the fluid.

According to the seventh aspect of the present invention, since straightening members are made thinner in a downstream direction, resistance to the flow of the fluid can be further reduced over the entire lengths of the straightening members.

What is claimed is:

1. A heat sensitive flow sensor having a main conduit which is a fluid passage and a metering pipe stored in the main conduit and incorporating a detection element, the metering pipe having an inflow port and an outflow port; wherein straightening members extending in a direction parallel to a central axis of the metering pipe are provided between the main conduit and the metering pipe and arranged so as to bridge the main conduit to the metering pipe, and wherein the straightening members comprise a projected portion projecting beyond at least one of the inflow port in an upstream direction of the metering pipe and the outflow port in a downstream direction of the metering pipe.

2. The heat sensitive flow sensor of claim 1, wherein the straightening members comprise plate-like straightening members.

3. The heat sensitive flow sensor of claim 1, wherein the straightening members are cut away on a side of the outflow port.

4. The heat sensitive flow sensor of claim 1, wherein a plurality of straightening members are provided at positions for dividing a peripheral direction of the metering pipe.

5. The heat sensitive flow sensor of claim 1, wherein end portions on an upstream side of the straightening members are tapered off.

6. The heat sensitive flow sensor of claim 1, wherein the straightening members are made thinner gradually in a downstream direction.

7. A heat sensitive flow sensor having a main conduit which is a fluid passage and a metering pipe stored in the main conduit and incorporating a detection element, the metering pipe having an inflow port and an outflow port; wherein a straightening member extending in a direction parallel to a central axis of the metering pipe is provided between the main conduit and the metering pipe and arranged so as to bridge the main conduit to the metering pipe, and wherein the straightening member comprises a projected portion projecting beyond the inflow port in an upstream direction of the metering pipe.

* * * * *

UNITED STATES PATENT AND TRADEMARK OFFICE
CERTIFICATE OF CORRRECTION

PATENT NO. : 6,018,994
DATED : February 1, 2000
INVENTOR(S) : Fumiyoshi Yonezawa, et al.

It is certified that error appears in the above-identified patent and that said Letters Patent is hereby corrected as shown below:

On the title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 4 | 4 | 9 | 4 | 0 | 1 | 05/22/84 | Kaiser, et al | | | |
| | | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | EP | 3 | 1 | 3 | 0 | 8 | 9 | A2 | 04/26/89 | European | | | | |
| | | | | | | | | | | | | | | | |

Signed and Sealed this

Sixteenth Day of May, 2000

*Attest:*

Q. TODD DICKINSON

*Attesting Officer*   *Director of Patents and Trademarks*